(12) United States Patent
Takagi

(10) Patent No.: US 6,839,897 B2
(45) Date of Patent: Jan. 4, 2005

(54) STUB SEARCH LOADING SYSTEM AND METHOD, SERVER APPARATUS, CLIENT APPARATUS, AND COMPUTER-READABLE RECORDING MEDIUM

(75) Inventor: Junji Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 492 days.

(21) Appl. No.: 09/982,950

(22) Filed: Oct. 22, 2001

(65) Prior Publication Data

US 2002/0059212 A1 May 16, 2002

(30) Foreign Application Priority Data

Oct. 23, 2000 (JP) ........................................ 2000-322269

(51) Int. Cl.[7] ................................................ G06F 9/46
(52) U.S. Cl. ..................................... 719/330; 719/315
(58) Field of Search ................................ 719/310–320, 719/330; 707/10

(56) References Cited

U.S. PATENT DOCUMENTS

| | | |
|---|---|---|
| 5,999,988 A | 12/1999 | Pelegri-Llopart et al. |
| 6,487,607 B1 * | 11/2002 | Wollrath et al. ............ 719/330 |
| 6,708,171 B1 * | 3/2004 | Waldo et al. ................. 707/10 |
| 2003/0084204 A1 * | 5/2003 | Wollrath et al. ............ 709/330 |

FOREIGN PATENT DOCUMENTS

| | | |
|---|---|---|
| EP | 0 803 811 | 10/1997 |
| JP | 10083308 A | 3/1998 |
| WO | WO 99/44134 | 9/1999 |
| WO | WO 00/23877 | 4/2000 |

* cited by examiner

*Primary Examiner*—St. John Courtenay, III
(74) *Attorney, Agent, or Firm*—Young & Thompson

(57) ABSTRACT

In a stub search loading system for, in executing remote method invocation from a plurality of clients to a server, downloading a stub necessary in a request source client from the server, the request source client includes a stub search section, and the server includes a stub search interface. The stub search section sends a stub request formed from a stub name and client identifier to the server and receives a stub returned from the server. In response to the stub request, the stub search interface returns to the request source client the stub appropriate for the runtime environment of the request source client on the basis of the designated stub name and client identifier. A stub search loading method, server apparatus, client apparatus, and computer-readable recording medium are also disclosed.

26 Claims, 12 Drawing Sheets

STUB SEARCH LOADING SYSTEM AND METHOD, SERVER APPARATUS, CLIENT APPARATUS, AND COMPUTER-READABLE RECORDING MEDIUM

BACKGROUND OF THE INVENTION

The present invention relates to a computer system having a remote method invocation mechanism and, more particularly, to a stub search loading system and method in a computer system in which a stub necessary on the client side is downloaded from the server side and used.

RMI (Remove Method Invocation) is a mechanism capable of invoking the method of a Java object on another Java virtual machine as if it were the method of an object on a given Java virtual machine and is used to built a distributed system using Java.

FIG. 10 shows the outline of the RMI mechanism. The RMI is processed according to the following procedure. First, an invocation from a client object to a server object is sent to a stub placed in the client (S31). The stub executes marshaling or the like for this invocation and transfers it to a skeleton in the server (S32). The skeleton executes unmarshaling or the like for the invocation received from the stub to generate the invocation to the server object and invokes the server object (S33). Marshaling means processing of converting an internal data expression format into a data format exchangeable between different systems, and unmarshaling means reverse processing.

The server object executes the invoked method and, if a return value is present, sends it to the skeleton (S34). The skeleton executes marshaling or the like for the received return value and returns it to the stub in the client (S35). The stub executes unmarshaling or the like for the received return value and returns it to the invocation source client object as the return value of method invocation (S36).

In this way, all invocations from a client object to a server object are done through a stub. That is, a stub serves as an agent for a server object on a client side in a distributed environment. Generally, one stub is necessary for each server object.

A sub and skeleton can be generated by, using an IDL (Interface Definition Language) compiler, an IDL file in which a server application invocation interface is described. In actual use of a stub and skeleton, in compiling a client application and server application, the stub and skeleton are generally linked and compiled together (this scheme will be referred to as a static scheme hereinafter). In the static scheme, however, information necessary to invoke a remote method must be determined not at the time of program execution but at the time of compiling. If a stub linked to a program does not match a remote method invoked in executing the program, an error may occur, resulting in a decrease in efficiency. In addition, the storage capacity must be large enough to store all stubs on the client side.

To solve this problem, a scheme in which a client dynamically downloads a stub from a server and uses it has been proposed, as disclosed in Japanese Patent Laid-Open No. 10-83308 (this scheme will be referred to as a dynamic scheme hereinafter). A conventional dynamic scheme will be described below with reference to the accompanying drawings.

FIG. 11 shows a conventional computer system that employs a dynamic scheme. In this conventional computer system, client computers 101 and 102, a server computer 103, and a name server computer 104 are connected to each other through a network 105.

A Java runtime environment 110 is built in the client computer 101. Classes 111 are executed under the Java runtime environment 110. A Java runtime environment means software required to execute a Java program, including a Java virtual machine. Each class 111 is a class file created by compiling a Java source code and is described using a code to be executed by a Java virtual machine. Referring to FIG. 11, all classes in the client computer 101, including stub classes, are expressed by the classes 111.

The Java runtime environment 110 includes a control section 112, a class loader 114 having a stub search section 113, and instances 115. The stub search section 113 downloads a stub class from the server computer 103. The class loader 114 loads to the Java runtime environment 110 the class 111 and the stub class downloaded by the stub search section 113. The instances 115 are objects obtained by converting the classes 111 and stub classes loaded by the class loader 114 into instances. Referring to FIG. 11, all instances in the Java runtime environment 110, including stub class instances, are expressed by the instances 115.

Each instance (object) 115 has a variable (status) and method (behavior). As is known, in object-oriented programming, such a plurality of objects (instances) exchange messages, and a program is executed by the interaction between the objects. The control section 112 is the control module of the Java runtime environment 110 and includes a Java virtual machine. The control section 112 generates the instance 115 by converting each of the classes downloaded by the class loader 114 into an instance and controls program execution on the client side.

The other client computer 102 has the same arrangement as that of the client computer 101.

A Java runtime environment 120 is built in the server computer 103. Under the Java runtime environment 120, classes 121 and skeleton classes 122 are executed. The Java runtime environment 120 includes a control section 123, class loader 124, and instances 125. The class loader 124 loads the class 121 and skeleton class 122 to the Java runtime environment 120. The instances 125 are objects generated by converting the classes 121 and skeleton classes 122 loaded by the class loader 124 into instances. Referring to FIG. 11, all instances in the Java runtime environment 120, including skeleton class instances, are expressed by the instances 125.

The control section 123 is the control module of the Java runtime environment 120 and includes a Java virtual machine. The control section 123 generates the instance 125 by converting each of the classes and skeleton classes loaded by the class loader 124 into an instance and controls program execution on the server side.

The server computer 103 also has stub classes 126 and stub search interface 127. The stub classes 126 and skeleton classes 122 are in a one-to-one correspondence. That is, pairs of skeleton classes 122 and stub classes 126 generated by compiling IDL files are held and managed by the server computer 103. Each of these stub classes 126 can be searched for in accordance with the name of the stub class. Upon receiving a download request with a designated stub class name from the stub search section 113 in the client computer 101 or 102, the stub search interface 127 searches for the stub class 126 having the designated stub class name and returns it to the stub search section 113 of the request source.

When the client computer 101 or 102 does not know the server computer 103 from which a necessary stub class should be downloaded, i.e., when the client computer 101 or 102 does not know the server computer 103 which holds the necessary stub class, the name server computer 104 notifies the client computer 101 or 102 of the corresponding server computer 103. Typically, the name server computer 104 manages a table which holds, for each stub class name, the identifier of the server computer 103 that holds the stub class. Upon receiving an inquiry with a designated stub class name from the client computer 101 or 102, the name server computer 104 looks up the table and returns the identifier of the corresponding server computer 103.

The RMI processing procedure in the conventional computer system will be described next with reference to the flow chart shown in FIG. 12.

When remote method invocation is done from the instance 115 of a certain class 111 to invoke a certain method of a certain class 121 in the server computer 103, the control section 112 in the Java runtime environment 110 of the client computer 101 determines whether the instance 115 of the stub class 126 to be used for the invocation is present in the Java runtime environment 110 (S101). If YES in step S101, the remote method invocation is realized using the instance 115 of the stub class 126 in accordance with the procedure described with reference to FIG. 10 (S102).

If the instance 115 of the stub class 126 to be used for the current invocation is not present in the Java runtime environment 110, the control section 112 determines whether the stub class 126 to be used for the current invocation is present in the classes 111 in the client computer 101 (S103). If YES in step S103, the control section 112 causes the class loader 114 to load the class 111 of the stub class to be used for the current invocation to the Java runtime environment 110 (S104) and convert the class 111 into an instance, thereby generating the instance 115 of the stub class 126 to be used for the current invocation (S105). The remote method invocation is realized using the instance 115 of the stub class 126 (S102).

If the stub class 126 to be used for the current invocation is not present in the classes 111, it is determined whether the client computer 101 side knows the location of the stub class 126 to be used for the current invocation (S106). The location of the stub class 126 to be used for the current invocation can be included in, e.g., that invocation. Alternatively, the location of each stub class 126 can be managed by the class loader 114. In such case, the client computer 101 side knows the location of the stub class 126.

On the other hand, if the client computer 101 side does not know the location of the stub class 126 to be used for the current invocation, the control section 112 designates the class name of the stub class and inquires the name server computer 104 about it (S107). In response to this inquiry, the name server computer 104 notifies the client computer 101 of the location of the stub class having the designated class name (S108).

When the location of the stub class 126 to be used for the current invocation is known, the control section 112 causes the stub search section 113 to designate the class name and request the stub class of the server computer 103 uniquely determined by the location (S109). The stub search interface 127 in the server computer 103 searches for the stub class having the designated class name from the stub classes 126 and returns the stub class to the client computer 101 of the request source (S110 and S111). The returned stub class is loaded to the Java runtime environment 110 by the class loader 114 (S104), and the instance of the stub class is generated by the control section 112 (S105). The remote method invocation is realized using the instance 115 of the stub class 126 (S102).

If no corresponding stub class is found by search by the stub search interface 127, a message representing it is returned to the client computer 101 (S112). In this case, the stub class download request on the client computer 101 side fails, and the remote method invocation is ended as an error by exceptional processing.

A stub class is the class of a stub class instance for executing marshaling or the like and has a structure depending on the stub class runtime environment, which is specified by the machine, OS (Operating System), or Java runtime environment of the client computer where the stub class is to be executed. For this reason, if the type of the Java runtime environment 110 where the stub classes are executed changes, stub classes on the client side, which are necessary to invoke the methods of the instances 125 to be executed under the Java runtime environment 120 of the server computer 103, have different contents even when they have the same class name.

In the conventional computer system described with reference to FIG. 11, the stub search section 113 in the client computer 101 requests a stub class by designating a class name, and the stub search interface 127 in the server computer 103 returns a stub class having the designated class name. This procedure poses no problem if the client computers 101 and 102 use the Java runtime environments 110 of the same type. However, if the types of the Java runtime environments are different, only a client computer having a Java runtime environment adaptive to the stub class downloaded from the server computer 103 normally operates, though the normal operation cannot be guaranteed for the remaining client computers.

This means that since the types of Java runtime environments are difference, the plurality of client computers 101 and 102 which cannot use the same stub class cannot execute remote method invocation for the same server computer 103 by acquiring a stub by the dynamic scheme. This also means that a plurality of server computers must be prepared to allow a plurality of client computers, which cannot use the same stub class because of the difference in the type of the Java runtime environment, to execute remote method invocation.

SUMMARY OF THE INVENTION

It is an object of the present invention to provide a stub search loading system and method, server apparatus, client apparatus, and computer-readable recording medium, which allow a plurality of client computers using different types of Java runtime environments to download, from a single server computer, a stub class that can be used for remote method invocation in each client computer.

It is another object of the present invention to provide a stub search loading system and method, server apparatus, client apparatus, and computer-readable recording medium, which can dynamically generate and download an appropriate stub class when a stub class requested by a client computer is not present in a server computer.

In order to achieve the above objects, according to the present invention, there is provided a stub search loading system for, in executing remote method invocation from a plurality of clients to a server, downloading a stub necessary in a request source client from the server, wherein the request source client comprises stub search means for sending a stub request formed from a stub name and client identifier to the server and receiving a stub returned from the server, and the server comprises a stub search interface for, in response to the stub request from the request source client, returning to the request source client the stub appropriate for a runtime environment of the request source client on the basis of the designated stub name and client identifier.

DESCRIPTION OF THE PREFERRED EMBODIMENTS

The present invention will be described below in detail with reference to the accompanying drawings.

Figure 1:
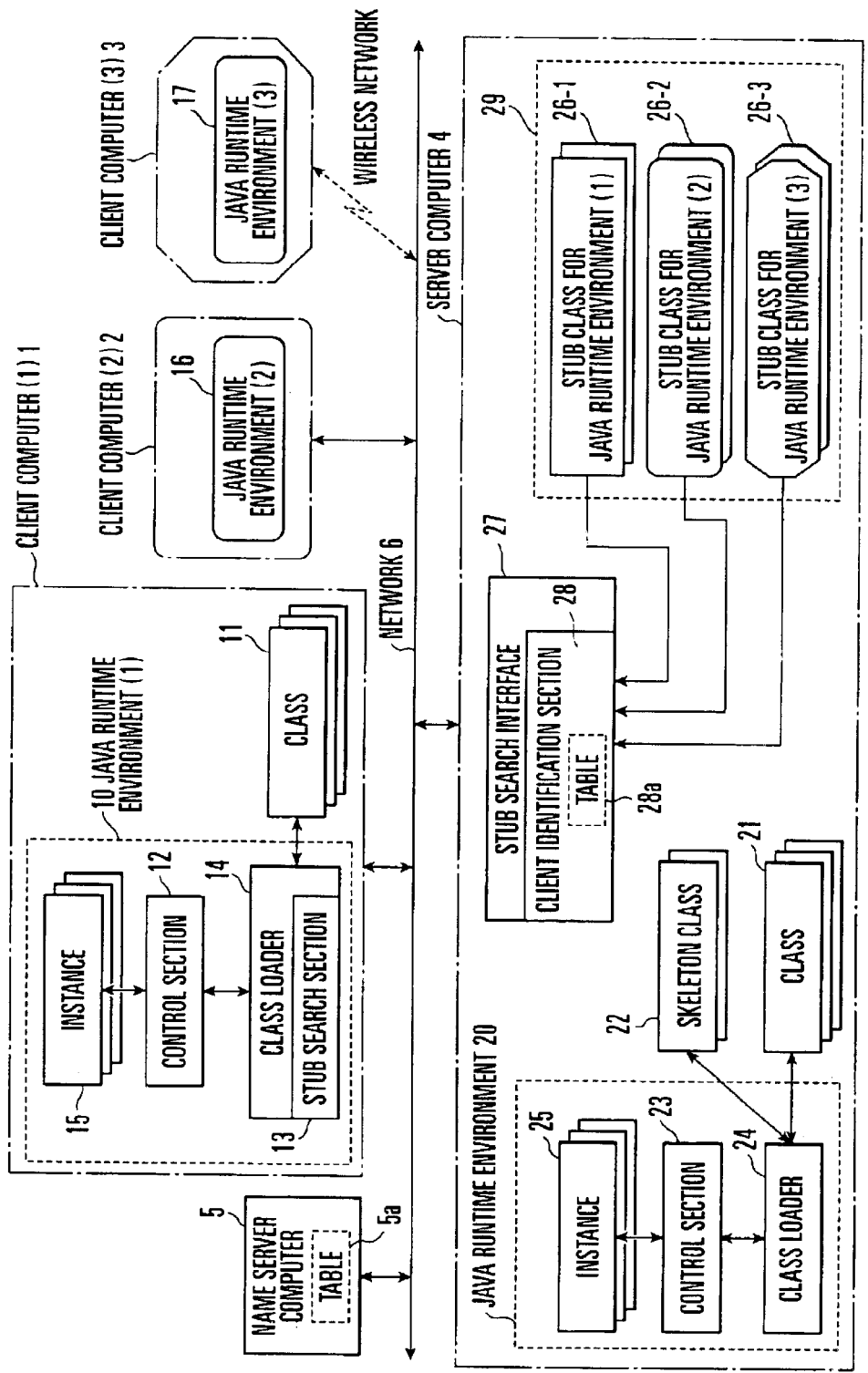
FIG. 1 is a block diagram of a computer system according to the first embodiment of the present invention.

FIG. 1 shows a computer system according to the first embodiment of the present invention. In the computer system of this embodiment, client computers 1 to 3, a server computer 4, and a name server computer 5 are connected to each other through a network 6. The network 6 is an arbitrary network capable of digital data transmission/reception between computers, such as a LAN (Local Area Network), WAN (Wide Area Network), public switched telephone network, or Internet. The communication medium on the network can be either wired communication or wireless communication, or any other medium.

A Java runtime environment (1) 10 is built in the client computer 1. Classes 11 are executed under the Java runtime environment 10. Each class 11 is a class file created by compiling a Java source code and is described using a code to be executed by a Java virtual machine. Referring to FIG. 1, all classes in the client computer 1, including stub classes, are expressed by the classes 11.

The Java runtime environment 10 includes a control section 12, a class loader 14 having a stub search section 13, and instances 15. The stub search section 13 downloads a stub class from the server computer 4. The class loader 14 loads to the Java runtime environment 10 the class 11 and the stub class downloaded by the stub search section 13. The instances 15 are objects obtained by converting the classes 11 and stub classes loaded by the class loader 14 into instances. Referring to FIG. 1, all instances in the Java runtime environment 10, including stub class instances, are expressed by the instances 15.

The control section 12 is the control module of the Java runtime environment 10 and includes a Java virtual machine. The control section 12 generates the instance 15 by converting each of the classes downloaded by the class loader 14 into an instance and controls program execution on the client side.

The remaining client computers 2 and 3 have the same arrangement as that of the client computer 1. However, since the client computers 1, 2, and 3 use different computer machines and OSs, the types of the built Java runtime environments are different. That is, in this embodiment, three, first to third Java runtime environments are present. The Java runtime environment (1) 10 is built in the client computer 1, a Java runtime environment (2) 16 is built in the client computer 2, and a Java runtime environment (3) 17 is built in the client computer 3.

A Java runtime environment (1) 20 is built in the server computer 4. Under the Java runtime environment 20, classes 21 and skeleton classes 22 are executed. The Java runtime environment (1) 20 includes a control section 23, class loader 24, and instances 25. The class loader 24 loads the class 21 and skeleton class 22 to the Java runtime environment (1) 20. The instances 25 are objects generated by converting the classes 21 and skeleton classes 22 loaded by the class loader 24 into instances. Referring to FIG. 1, all instances in the Java runtime environment (1) 20, including skeleton class instances, are expressed by the instances 25.

The control section 23 is the control module of the Java runtime environment (1) 20 and includes a Java virtual machine. The control section 23 generates the instance 25 by converting each of the classes and skeleton classes loaded by the class loader 24 into an instance and controls program execution on the server side.

The server computer 4 also has a storage section 29 for stub classes 26-1 to 26-3, and a stub search interface 27 having a client identification section 28. The stub classes 26-1 form a set of stub classes which can be used in executing remote method invocation in the client computer 1 having the Java runtime environment (1). The stub classes 26-2 and 26-3 form sets of stub classes which can be used in executing remote method invocation in the client computers 2 and 3 having the Java runtime environments (2) and (3).

Each stub class in the stub classes 26-1 to 26-3 is held to be searched for in accordance with the name of the stub class. Stub classes in the stub classes 26-1 to 26-3, which are to be used for the same remote method invocation, i.e., stub classes to be used to invoke the method of the same server object in the server computer 4 have the same class name.

Figure 2:
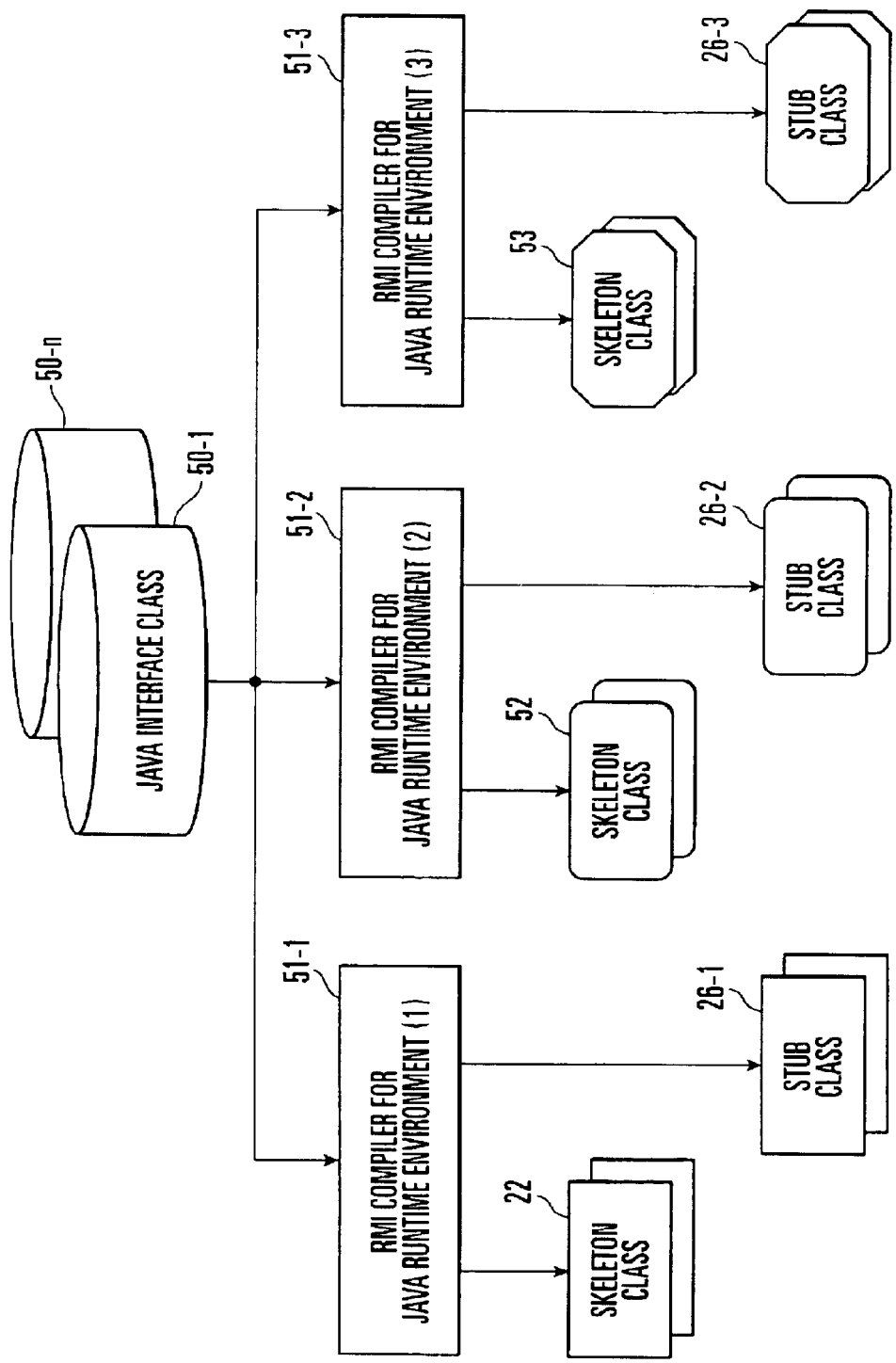
FIG. 2 is a block diagram showing an arrangement for generating stub classes to be held in a server computer shown in FIG. 1.

FIG. 2 shows an arrangement for generating the stub classes 26-1 to 26-3 to be held in the server computer 4. Referring to FIG. 2, Java interface classes (classes each having only the information of the name and type of a method and no method mounting code) 50-1 to 50-*n* define the interfaces of services provided by the server computer 4. Each of the Java interface classes 50-1 to 50-*n* is present for a corresponding service provided by the server computer 4.

An RMI compiler 51-1 generates skeleton classes and stub classes for the Java runtime environment (1) from the Java interface classes 50-1 to 50-*n*. The RMI compiler 51-1 compiles each of the interface classes 50-1 to 50-*n*, thereby generating the skeleton classes 22 and stub classes 26-1 to be held in the server computer 4 shown in FIG. 1.

An RMI compiler 51-2 generates skeleton classes and stub classes for the Java runtime environment (2) from the Java interface classes. The RMI compiler 51-2 compiles each of the interface classes 50-1 to 50-n, thereby generating the stub classes 26-2 to be held in the server computer 4 shown in FIG. 1. Skeleton classes 52 that are simultaneously generated are not used.

An RMI compiler 51-3 generates skeleton classes and stub classes for the Java runtime environment (3) from the Java interface classes. The RMI compiler 51-3 compiles each of the interface classes 50-1 to 50-n, thereby generating the stub classes 26-3 to be held in the server computer 4 shown in FIG. 1. Skeleton classes 53 that are simultaneously generated are not used. As each of the RMI (Remote Method Invocation) compilers 51-1 to 51-3, for example, an rmic can be used.

In the arrangement shown in FIG. 2, one RMI compiler generates stub classes for one Java runtime environment. However, some RMI compilers can designate the type of stub classes to be generated by a compiler option. When such an RMI compiler is used, stub classes for a plurality of Java runtime environments can be generated by the single RMI compiler.

Figure 3:
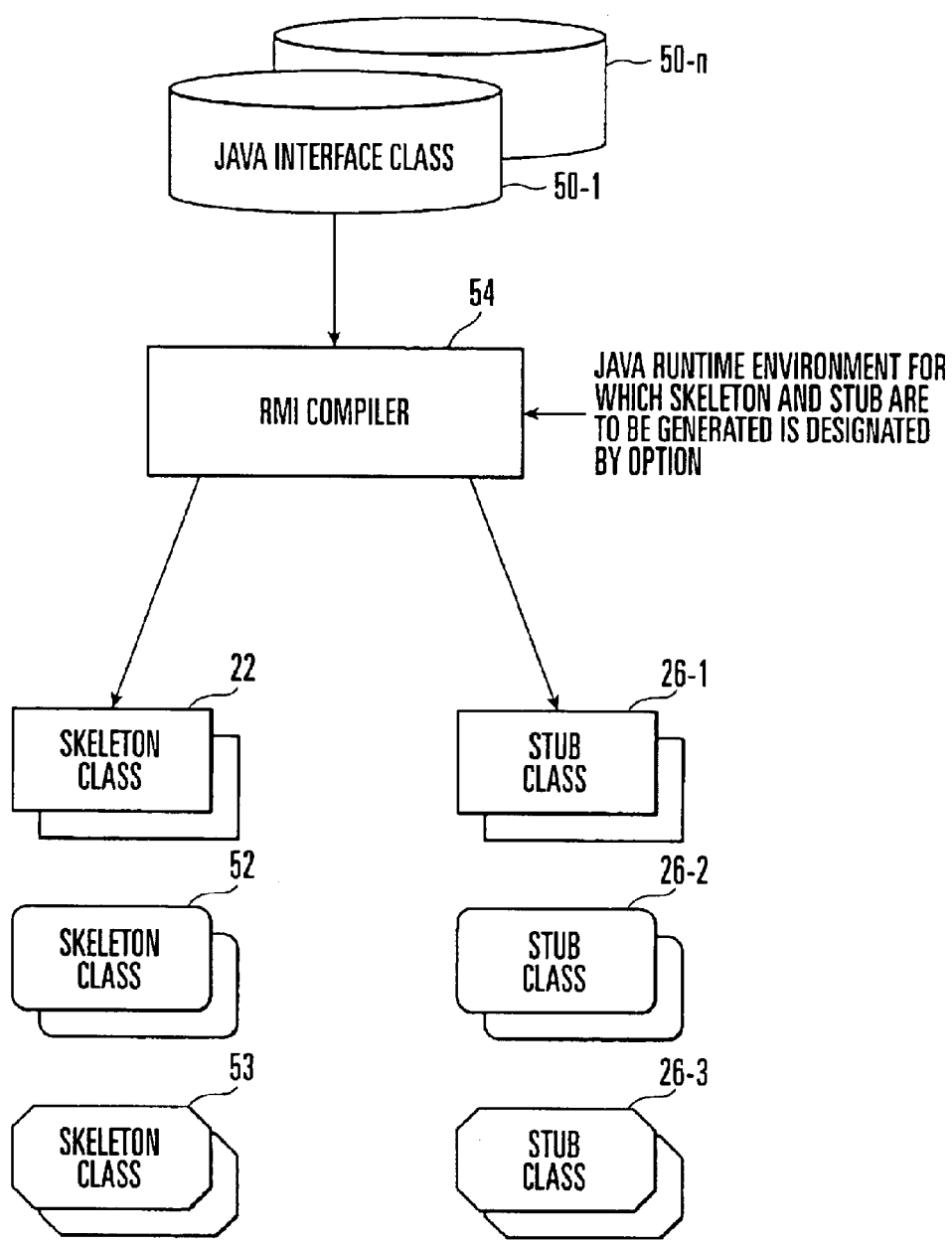
FIG. 3 is a block diagram showing another arrangement for generating stub classes to be held in the server computer shown in FIG. 1.

For example, in an rmic, by designating a compiler option, stubs and skeletons for the JRMP stub protocol version 1.1, stubs and skeletons for the JRMP stub protocol version 1.2, or stubs and skeletons compatible with both the JRMP stub protocol versions 1.1 and 1.2 can be generated. FIG. 3 shows an arrangement for generating stub classes for a plurality of Java runtime environments using an RMI compiler 54 having such a function.

Referring to FIG. 3, an option designation for the Java runtime environment (1) (e.g., a designation for generating stubs and skeletons compatible with both the JRMP stub protocol versions 1.1 and 1.2) is given to the RMI compiler 54, and it is caused to compile each of the interface classes 50-1 to 50-n. With this processing, the skeleton classes 22 and stub classes 26-1 to be held in the server computer 4 shown in FIG. 1 are generated.

In addition, an option designation for the Java runtime environment (2) (e.g., a designation for generating stubs and skeletons for the JRMP stub protocol version 1.1) is given to the RMI compiler 54, and it is caused to compile each of the interface classes 50-1 to 50-n. With this processing, the stub classes 26-2 to be held in the server computer 4 shown in FIG. 1 are generated. The skeleton classes 52 that are simultaneously generated are not used.

Furthermore, an optional designation for the Java runtime environment (3) (e.g., a designation for generating stubs and skeletons for the JRMP stub protocol version 1.2) is given to the RMI compiler 54, and it is caused to compile each of the interface classes 50-1 to 50-n. With this processing, the stub classes 26-3 to be held in the server computer 4 shown in FIG. 1 are generated. The skeleton classes 53 that are simultaneously generated are not used.

Referring back to FIG. 1, upon receiving a stub request with a designated stub class name from one of the client computers 1 to 3, the client identification section 28 identifies a client identifier sent together and determines which set in the stub classes 26-1 to 26-3 should be defined as a search target. The client identification section 28 holds, e.g., a table 28a that holds the correlation between client identifiers and the names of sets of stub classes (the names of the stub classes 26-1 to 26-3) and specifies a corresponding set of stub classes by searching the table 28a using the client identifier. The stub search interface 27 searches for the stub class having the stub class name designated by the stub request from one of the stub classes 26-1 to 26-3, which is determined by the client identification section 28, and returns the stub class to the client computer 1, 2, or 3 of the request source.

In response to the inquiry with the designated stub class name from the client computer 1, 2, or 3, the name server computer 5 looks up, e.g., a table 5a which holds and manages, for each stub class name, the location information of the stub class. With this processing, the location of the stub class is found and returned to the client computer 1, 2, or 3 of the inquiry source.

Figure 4:
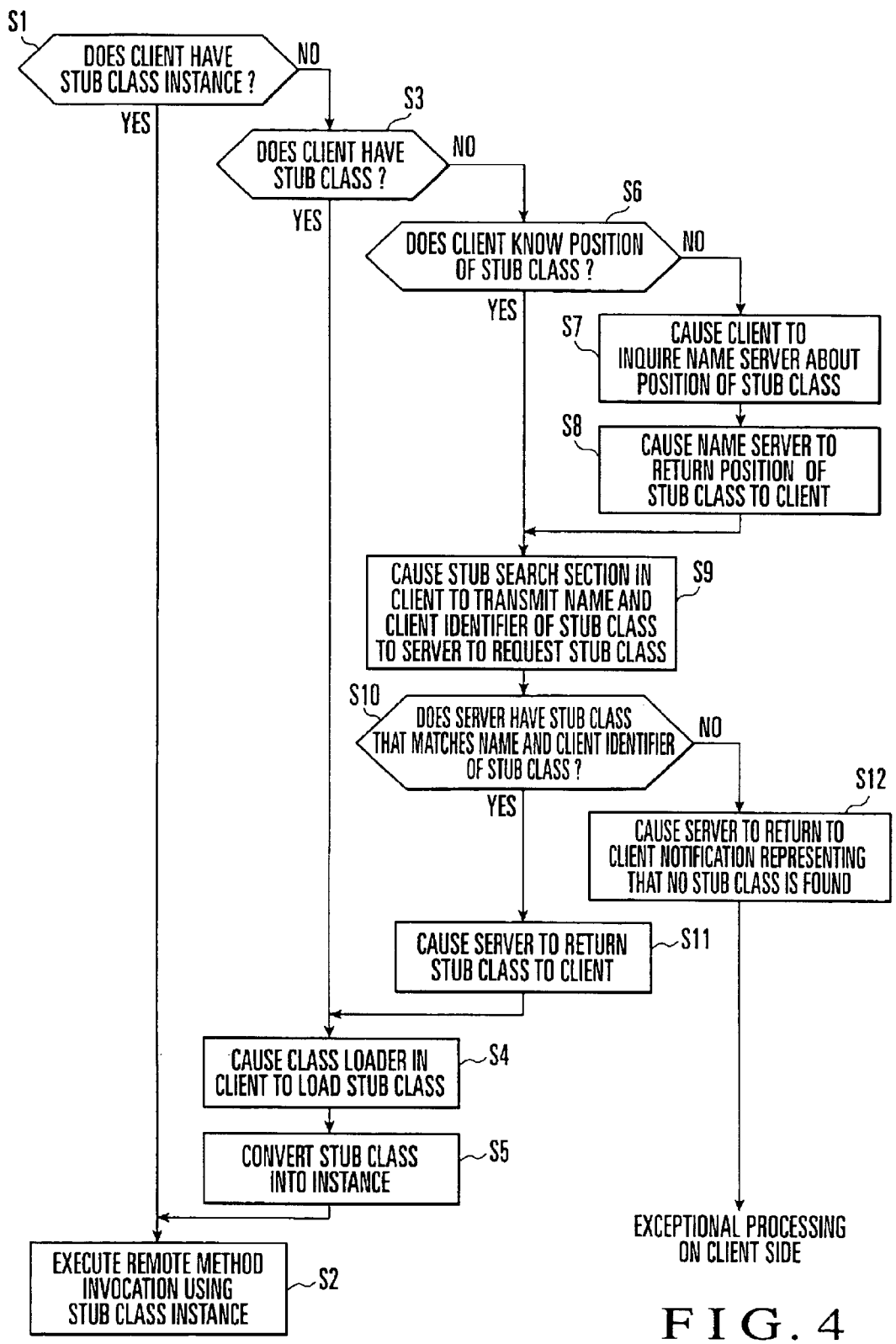
FIG. 4 is a flow chart showing the RMI processing procedure in the computer system shown in FIG. 1.

The RMI processing procedure in the computer system shown in FIG. 1, and mainly, stub class download operation as a characteristic feature of the present invention will be described next with reference to the flow chart shown in FIG. 4.

Figure 10:
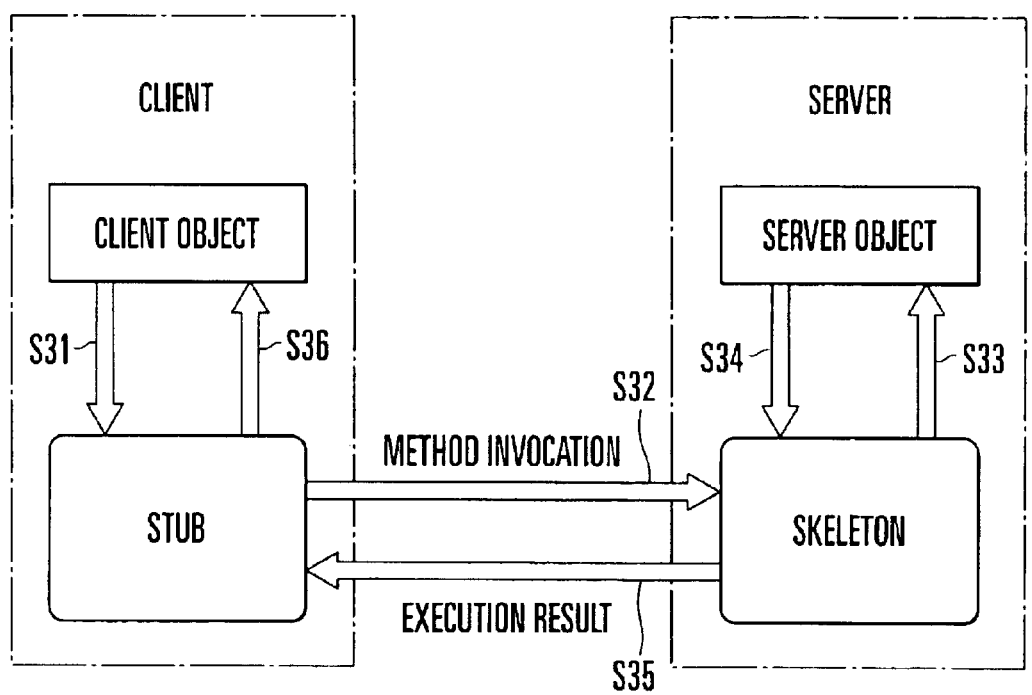
FIG. 10 is a view showing the outline of an RMI mechanism.
Figure 11:
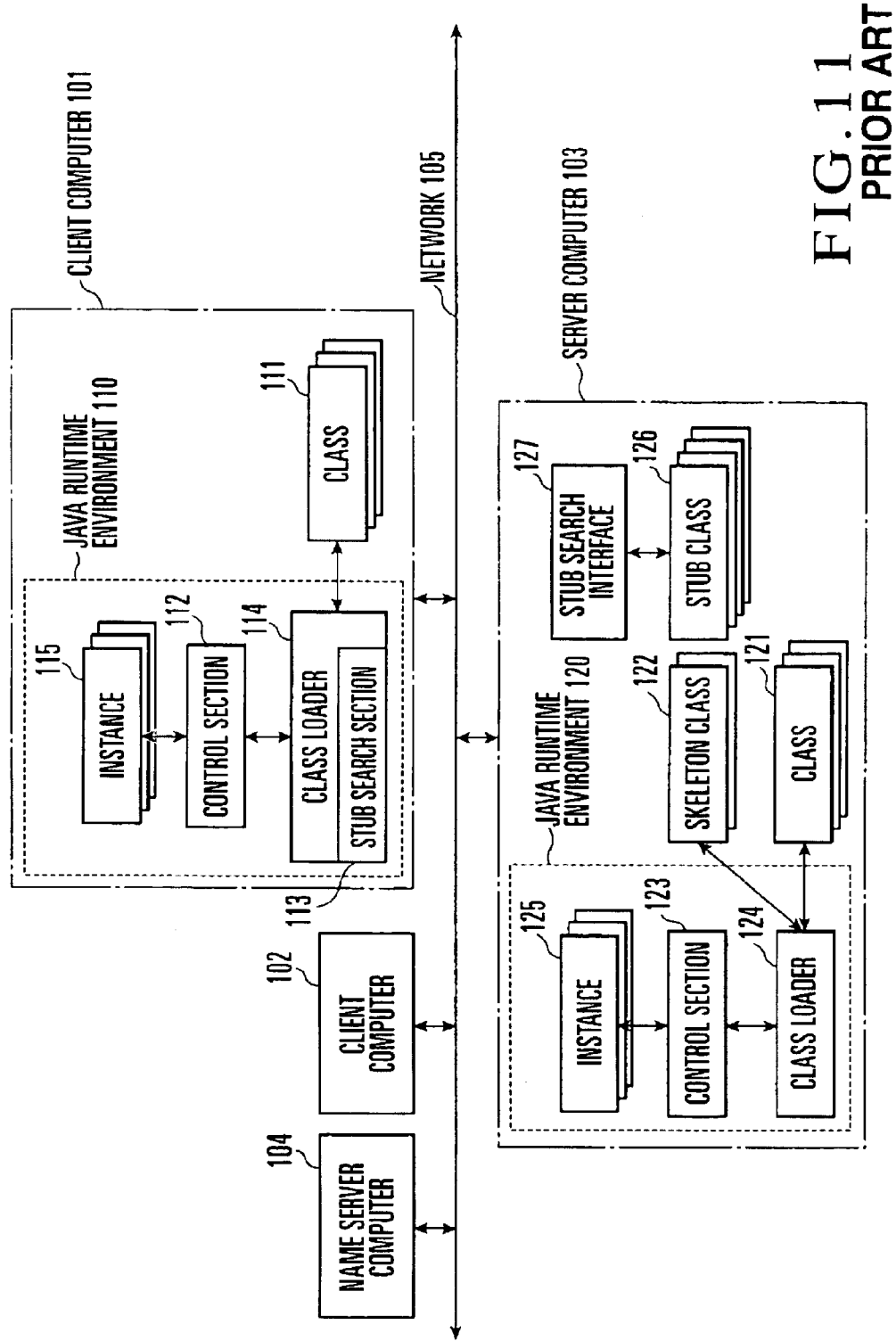
FIG. 11 is a block diagram of a conventional computer system.
Figure 12:
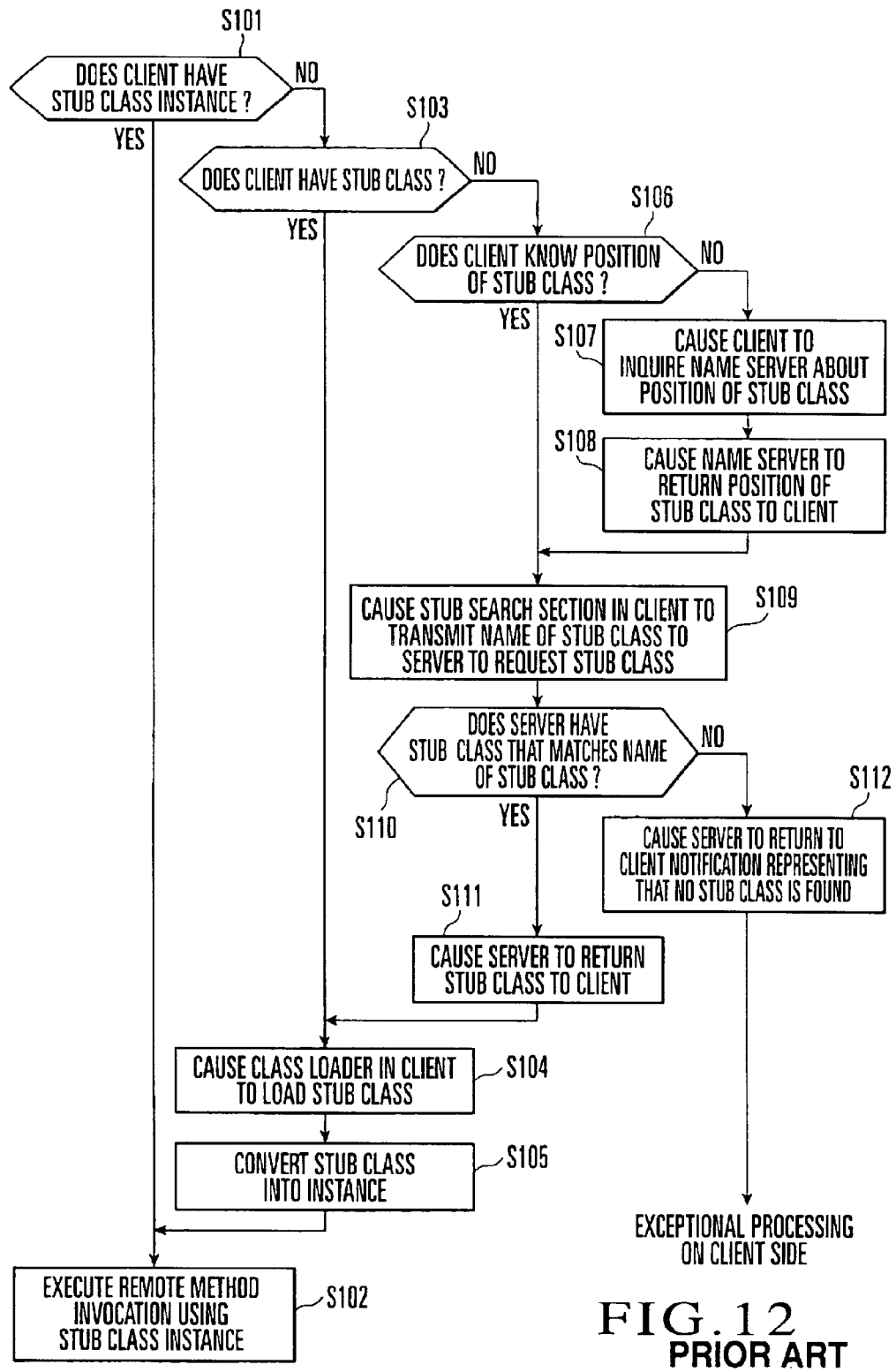
FIG. 12 is a flow chart showing the RMI processing procedure in the conventional computer system.

For example, when remote method invocation is done from the instance 15 of a certain class 11 to invoke a certain method of a certain class 21 in the server computer 4, the control section 12 in the Java runtime environment 10 of the client computer 1 determines whether the instance of a stub class to be used for the invocation is present in the instances 15 of the Java runtime environment 10 (step S1). If YES in step S1, the remote method invocation is realized using the instance 15 of that stub class in accordance with the procedure described with reference to FIG. 10 (step S2).

If the instance 15 of the stub class to be used for the current invocation is not present in the Java runtime environment 10, the control section 12 determines whether the stub class to be used for the current invocation is present in the classes 11 in the client computer 1 (step S3). If YES in step S3, the control section 12 causes the class loader 14 to load the class 11 of the stub class to be used for the current invocation to the Java runtime environment 10 (step S4) and convert the class 11 into an instance, thereby generating the instance 15 of the stub class to be used for the current invocation (step S5). The remote method invocation is realized using the instance 15 of the stub class (step S2).

If the stub class to be used for the current invocation is not present in the classes 11 in the client computer 1, it is determined whether the client computer 1 side knows the location of the stub class to be used for the current invocation (step S6). This determination processing is the same as in the prior art. If YES in step S6, the flow advances to step S9. If NO in step S6, the class name of the stub class is designated, and the name server computer 5 is inquired about it (step S7). In response to this inquiry, the name server computer 5 notifies the client computer 1 of the location of the stub class having the designated class name (step S8).

When the location of the stub class to be used for the current invocation is known, the control section 12 causes the stub search section 13 to designate the class name and client identifier and request the stub class of the server computer 4 uniquely determined by the location (step S9).

A client identifier is formed from the type or model of the client computer 1, the type of the OS, the type of the Java runtime environment (1), the type of the control section 12, or a network address, or any other client information, or a combination of two or more of them. The client identifier may be information explicitly transmitted by the stub search section 13. The client identifier may be information such as a network address which is implicitly transmitted when a stub class request is transmitted and with which the client identification section 28 in the server computer 4 can identify the client computer. That is, the client identifier can be any information with which a runtime environment where a downloaded stub is executed can be directly or indirectly specified.

The stub search interface 27 in the server computer 4 determines, on the basis of the client identifier received by the client identification section 28, which set in the stub classes 26-1 to 26-3 should be defined as a search target. The stub class having the stub class name designated by the stub request is searched for from the determined set of stub classes 26-1, 26-2, or 26-3 (step S10). In this case, the stub class is searched for from the stub classes 26-1 for the Java runtime environment (1).

If a corresponding stub class is present, it is returned to the client computer 1 of the request source (step S11). If no corresponding stub class is present, a notification representing that no corresponding stub class is held is sent to the client computer 1 (step S12). In this case, the stub class download request fails, exceptional processing is executed in the client computer 1, and, for example, the remote method invocation is ended as an error.

Upon receiving the stub class from the server computer 4 as the request destination, the stub search section 13 in the client computer 1 transfers the stub class to the class loader 14. The class loader 14 loads the stub class to the Java runtime environment 10 (step S4). The control section 12 converts the loaded stub class into an instance to generate the instance 15 (step S5), and the remote method invocation is realized using the instance 15 (step S2).

The operation has been described above by exemplifying the client computer 1. RMI processing in the remaining client computers 2 and 3 is also executed according to the same procedure as described above except that when a stub class request is sent from the client computer 2 or 3 to the server computer 4, the client identifier of the client computer 2 or 3 is sent. Hence, upon receiving a stub class request from the client computer 2, the stub search interface 27 in the server computer 4 searches for the stub classes 26-2 for the Java runtime environment (2). Upon receiving a stub class request from the client computer 3, the stub search interface 27 searches for the stub classes 26-3 for the Java runtime environment (3).

According to this embodiment, stub classes that can be used for remote method invocation in the client computers 1 to 3 are downloaded from the single server computer 4 to the plurality of client computers 1 to 3 having different types of Java runtime environments. This makes it possible to execute remote method invocation for the method of the same server object. For this reason, the server computer need to have only one service having the same inlet for the client computers 1 to 3 with different configurations.

The operation of this embodiment will be described next using a specific example.

A client Foo on the client computer 1 executes remote method invocation for the server. When the stub class of BankServiceImpl class as a class having BankService interface is necessary, the client computer 1 inquires the name server computer 5 about the location of the stub class of BankServiceImpl. In response to this inquiry, http://japan/BankServiceImpl Stub.class is returned.

The client computer 1 requests http://japan/BankServiceImpl Stub.class of japan server using the HTTP protocol while adding a character string "User-Agent:Foo" as a client identifier to the HTTP header. The server computer 4 extracts http://japan/client/Foo/BankServiceImpl Stub.class as a stub class that matches the client identifier "Foo" and returns the stub class to the client computer 1.

When a client Bar on the client computer 2 executes remote method invocation for the server, the name server computer is inquired. The procedure until http://japan/BankServiceImpl Stub.class is returned in response to this inquiry is the same as described above. Next, in requesting http://japan/BankServiceImpl Stub.class of japan server using the HTTP protocol, a character string "User-Agent:Bar" as a client identifier is added to the HTTP header. The server computer 4 extracts http://japan/client/Bar/BankServiceImpl Stub.class as a stub class that matches the client identifier "Bar" and returns the stub class to the client computer 2.

The stub classes downloaded to the client computers 1 and 2 and converted into instances communicate with the skeleton of BankServiceImpl of japan server to realize remote method invocation.

Figure 5:
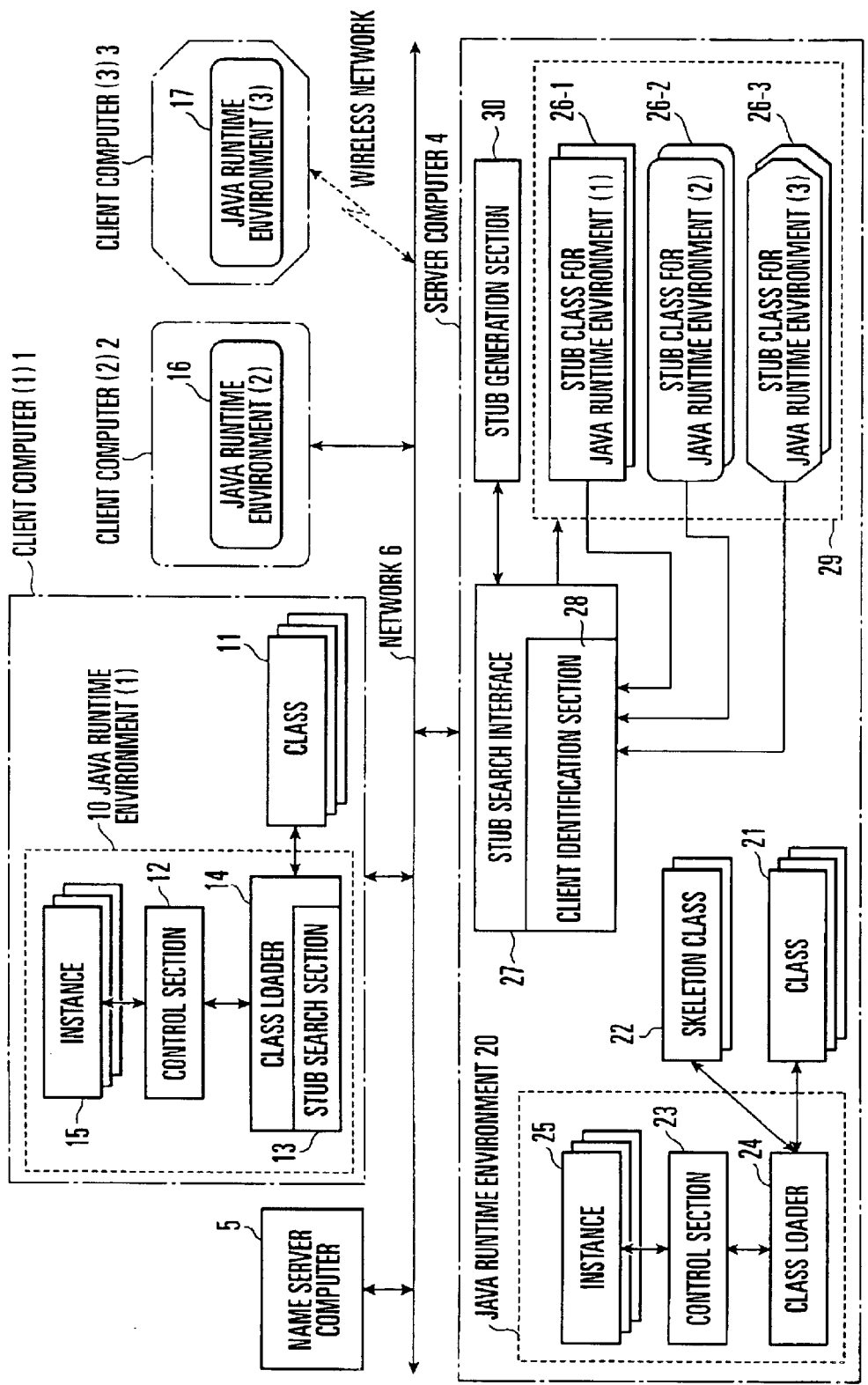
FIG. 5 is a block diagram of a computer system according to the second embodiment of the present invention.

FIG. 5 shows a computer system according to the second embodiment of the present invention. The same reference numerals as in FIG. 1 denote the same parts in FIG. 5. The second embodiment is different from the first embodiment in that a server computer 4 has a stub generation section 30 for generating a stub class for each of clients with different runtime environments.

When an appropriate stub class to be returned to a client computer 1, 2, or 3 that has requested the stub class is not present in stub classes 26-1, 26-2, or 26-3 in a storage section 29, a stub search interface 27 sends a stub generation request with a designated stub class name and client identifier to the stub generation section 30. Upon receiving this request, the stub generation section 30 dynamically generates a corresponding stub, and the stub search interface 27 returns the generated stub to the client computer 1, 2, or 3 of the request source. The newly generated stub class is also stored in the storage section 29 to cope with a later stub request.

Figure 6:
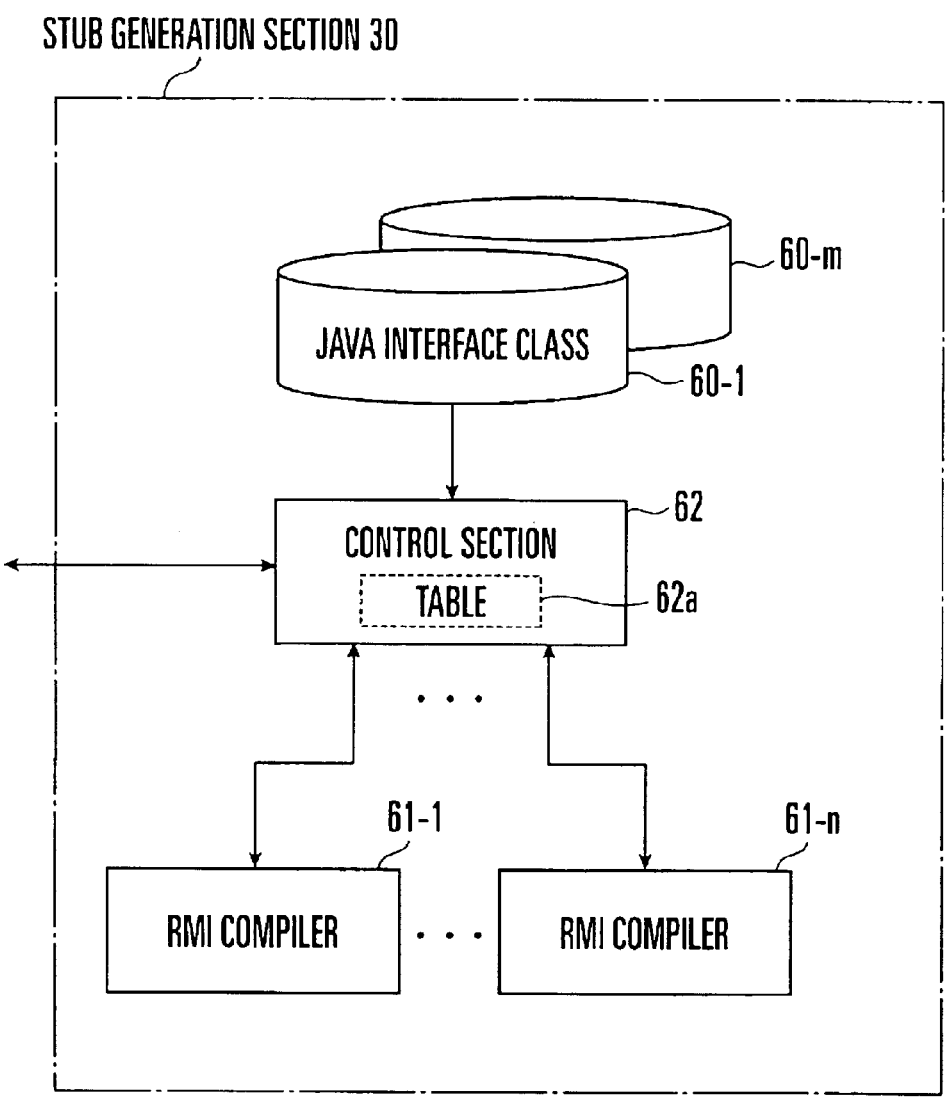
FIG. 6 is a block diagram of a stub generation section shown in FIG. 5.

FIG. 6 shows the arrangement of the stub generation section 30. Referring to FIG. 6, Java interface classes (classes each having only the information of the name and type of a method and no method mounting code) 60-1 to 60-*m* define the interfaces of services provided by the server computer 4. Each of the Java interface classes 60-1 to 60-*m* is present for a corresponding service provided by the server computer 4. Each of RMI compilers 61-1 to 61-*n* is the same as that described with reference to FIG. 2 or 3 and generates skeleton classes and stub classes from the Java interface classes. A control section 62 controls the respective sections upon receiving a stub generation request with a designated stub class name and client identifier from the stub search interface 27.

The control section 62 manages, in an internal table 62*a*, correlation between each of the interface classes 60-1 to 60-*m* and a stub class name. The control section 62 also determines a client identifier and manages, using, e.g., a correlation table (not shown) between client identifiers and the RMI compilers 61-1 to 61-*n*, which of the plurality of RMI compilers 61-1 to 61-*n* should be used and which compiler option should be designated to generate a stub to be executed in the runtime environment of the client represented by the client identifier.

The control section 62 inputs one of the interface classes 60-1 to 60-*m*, which is selected by the stub class name designated by the stub generation request from the stub search interface 27, to one of the RMI compilers 61-1 to 61-*n*, which is selected by the client identifier designated by the stub generation request (also designates a compiler option as needed), thereby causing the RMI compiler to compile the interface class. Of the skeleton class and stub class generated by the RMI compiler, the stub class is returned to the stub search interface 27 of the request source.

When no corresponding interface class is present or when no corresponding stub can be generated because of the absence of a corresponding RMI compiler, the control section 62 sends a notification representing it to the stub search interface 27.

Figure 7:
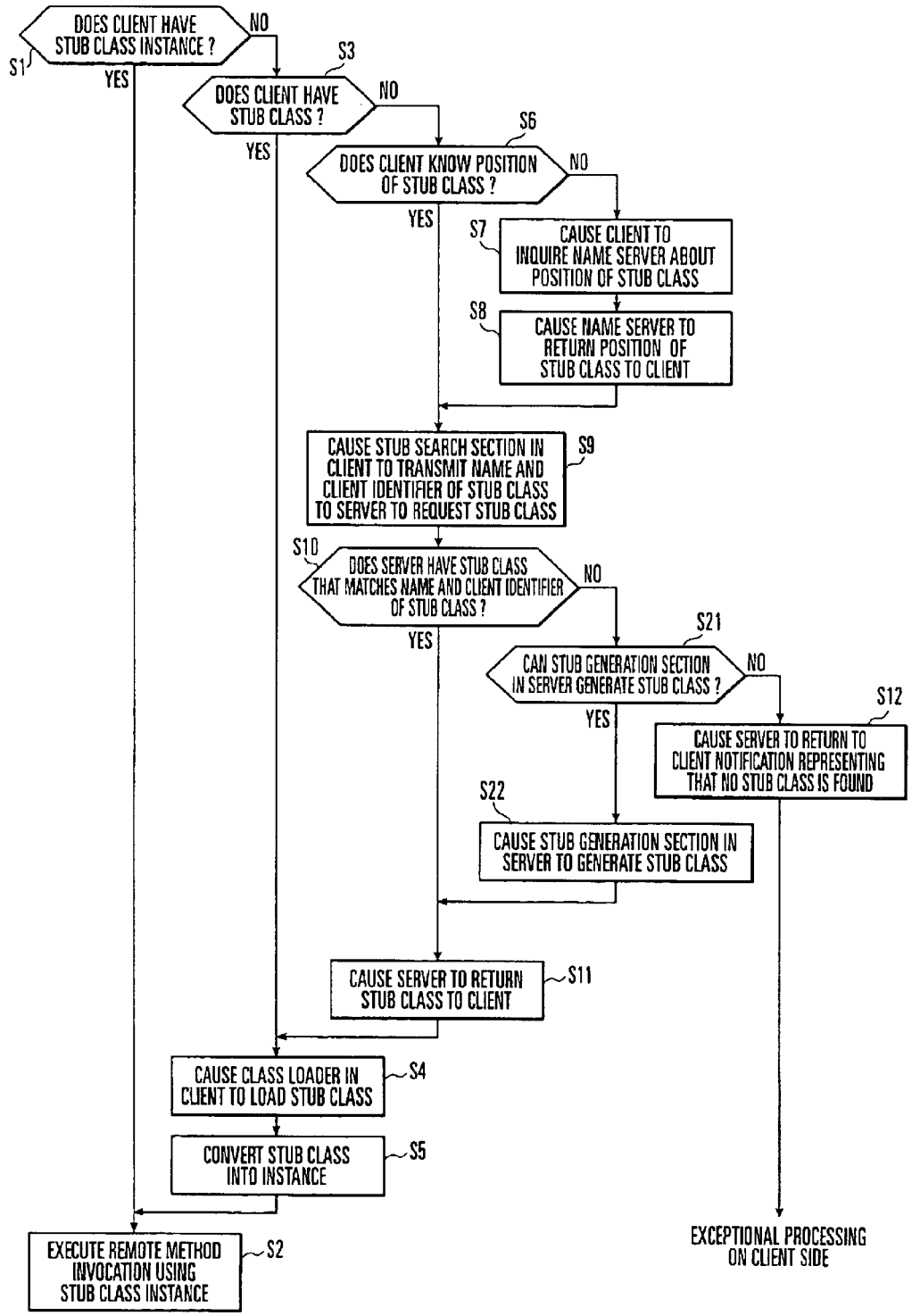
FIG. 7 is a flow chart showing the RMI processing procedure in the computer system shown in FIG. 5.

The RMI processing procedure of this embodiment will be described next with reference to the flow chart shown in FIG. 7. The same reference numerals as in FIG. 4 denote the same steps in FIG. 7.

In this embodiment, when it is determined by stub class search by the stub search interface 27 that no corresponding stub class is present in the stub classes 26-1 to 26-3 (NO in step S10), the stub class name and client identifier are sent from the stub search interface 27 to activate the stub generation section 30. The control section 62 of the stub generation section 30 determines whether an interface class corresponding to the stub class name is present in the interface classes 60-1 to 60-*m* and whether an RMI compiler corresponding to the client identifier is present in the RMI compilers 61-1 to 61-*n*, thereby checking whether the requested stub class can be generated (step S21).

If YES in step S21, the corresponding stub class is dynamically generated under the control by the control section 62 of the stub generation section 30, and the generated stub class is returned to the stub search interface 27 (step S22). The stub search interface 27 returns the stub class to the client computer 1, 2, or 3 of the request source and stores the stub class in the storage section 29 (step S11).

If NO in step S21, a message representing it is returned from the stub generation section 30 to the stub search interface 27, and the stub search interface 27 sends a notification representing that no corresponding stub class is present to the client computer 1, 2, or 3 of the request source (step S12).

According to this embodiment, stub classes that can be used for remote method invocation in the client computers 1 to 3 are dynamically generated, as needed, and downloaded from the single server computer 4 to the plurality of client computers 1 to 3 having different types of Java runtime environments. This makes it possible to execute remote method invocation for the method of the same server object. For this reason, the server computer need to have only one service having the same inlet for the client computers 1 to 3 with different configurations. In addition, stub classes corresponding to all configurations need not be prepared in the server computer 4 in advance.

In this embodiment, the server computer 4 may be activated in a state wherein no stub classes are stored in the storage section 29 at all. Alternatively, some stub classes may be stored in the storage section 29 in advance at the time of activation of the server computer 4, as in the first embodiment. In addition, a stub class generated by the stub generation section 30 is stored in the storage section 29 in the above decryption, though the stub class need not always be stored.

Figure 8:
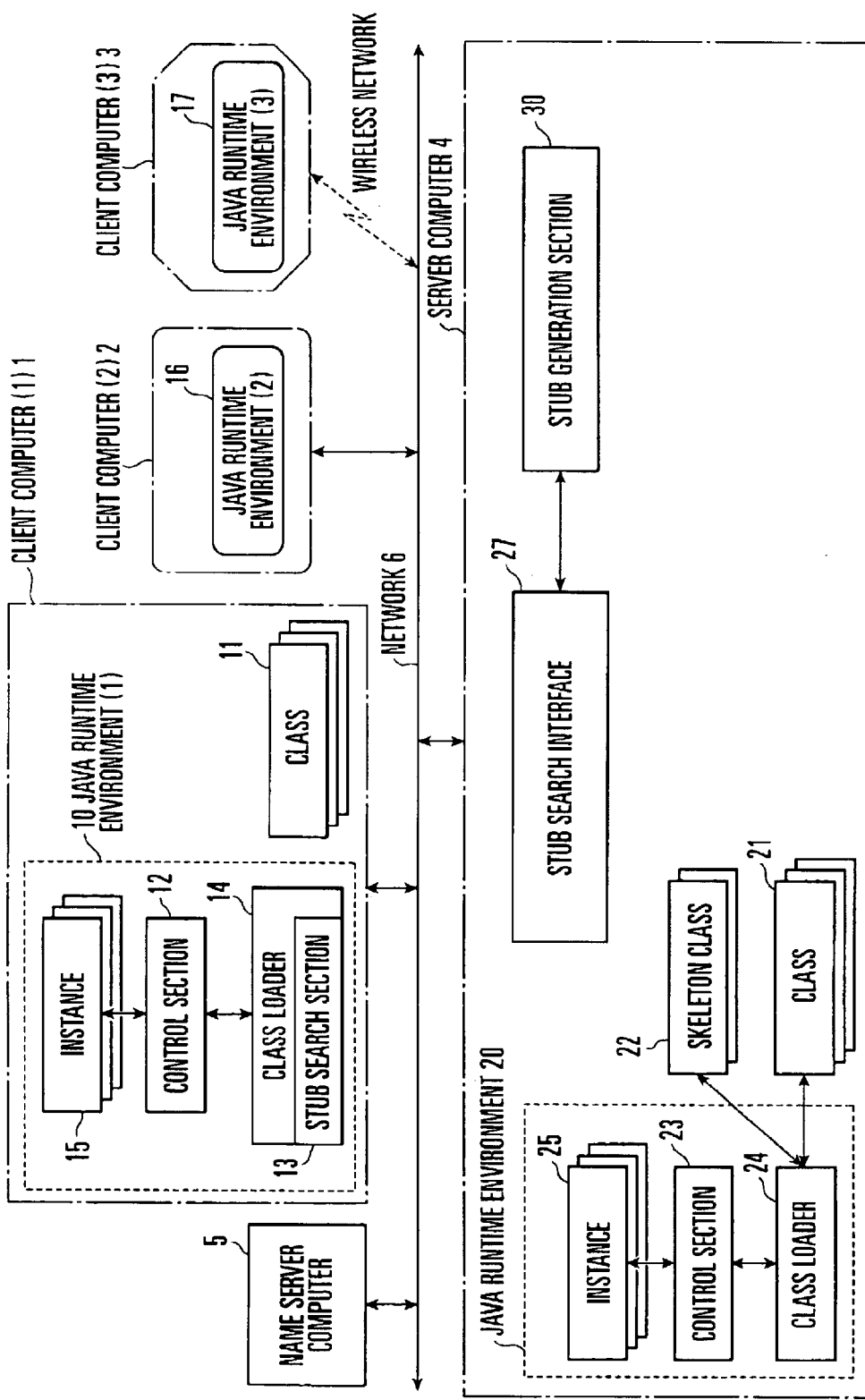
FIG. 8 is a block diagram of a computer system according to the third embodiment of the present invention.

FIG. 8 shows a computer system according to the third embodiment of the present invention. The same reference numerals as in FIG. 5 denote the same parts in FIG. 8. The third embodiment is different from the second embodiment shown in FIG. 5 in that a server computer 4 does not hold the sets of stub classes, and all stub classes download-requested from client computers 1 to 3 are dynamically generated. For this reason, a storage section 29 for stub classes 26-1 to 26-3 are omitted.

Upon receiving a stub request with a designated stub class name and client identifier from one of the client computers 1 to 3, a stub search interface 27 notifies a stub generation section 30 of the stub class name and client identifier to instruct the stub generation section 30 to generate a stub class. The stub generation section 30 generates the stub class according to the same procedure described with reference to FIG. 5 and returns the stub class to the stub search interface 27. The stub search interface 27 sends the stub class to the client computer 1, 2, or 3 of the request source. If the stub generation section 30 cannot generate a corresponding stub class, the stub search interface 27 sends a notification representing that no stub class is found to the client computer 1, 2, or 3 of the request source.

Figure 9:
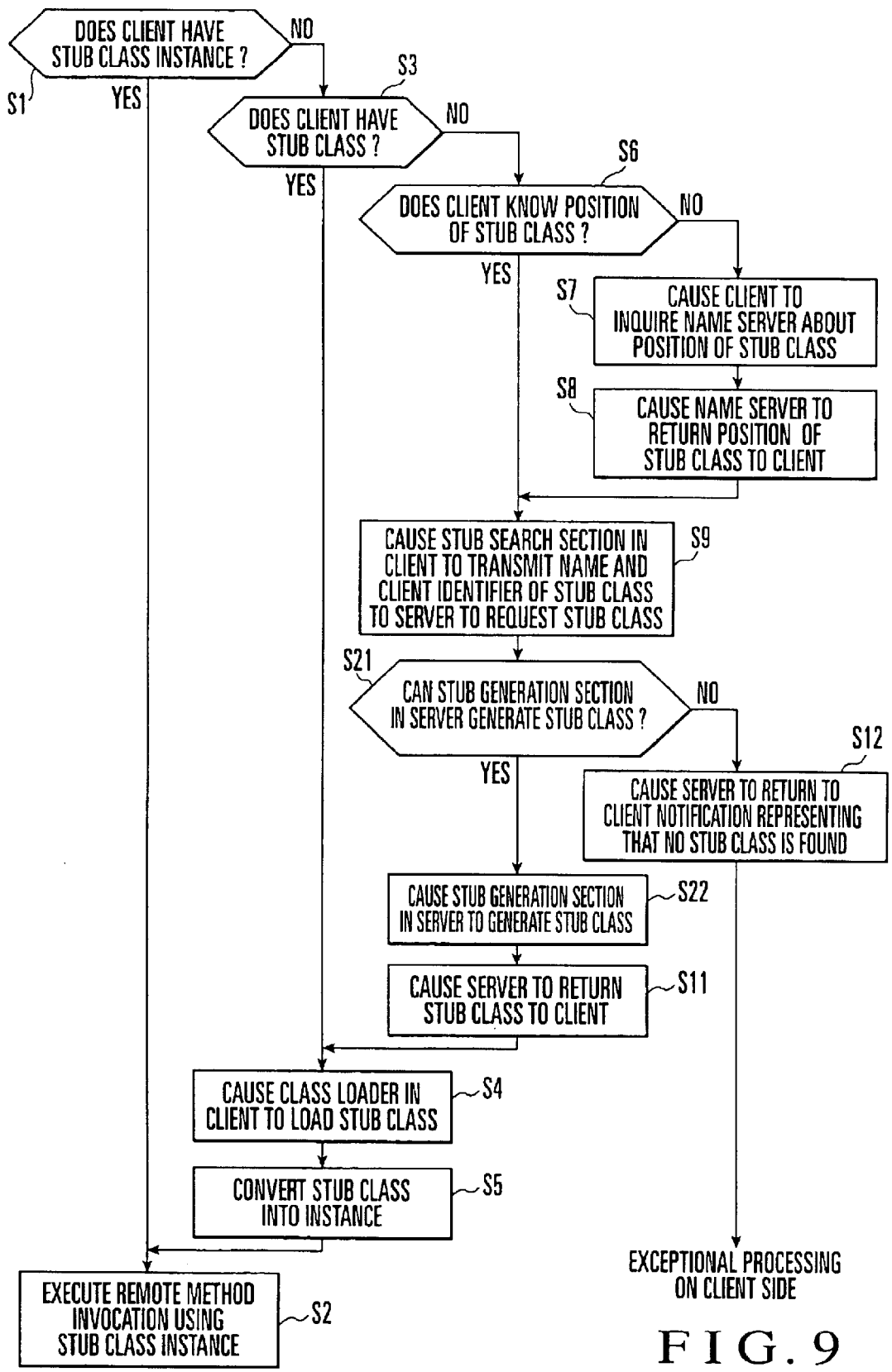
FIG. 9 is a flow chart showing the RMI processing procedure in the computer system shown in FIG. 8.

RMI processing of this embodiment will be described next with reference to the flow chart shown in FIG. 9. The same reference numerals as in FIG. 7 denote the same steps in FIG. 9. In this embodiment, when a stub request is received from the client computer, the stub generation section 30 is immediately activated from the stub search interface 27, and the stub generation section 30 checks whether it can generate a stub class (step S21).

If YES in step S21, the stub generation section 30 generates a corresponding stub class and transfers it to the stub search interface 27 (step S22). The stub search interface 27 returns the stub class to the client computer 1, 2, or 3 of the request source (step S11). If NO in step S21, a notification representing it is sent from the stub generation section 30 to the stub search interface 27. The stub search interface 27 sends a notification representing that no corresponding stub class is present to the client computer 1, 2, or 3 of the request source (step S12).

According to this embodiment, stub classes that can be used for remote method invocation in the client computers 1 to 3 are dynamically generated and downloaded from the single server computer 4 to the plurality of client computers 1 to 3 having different types of Java runtime environments. This makes it possible to execute remote method invocation for the method of the same server object. For this reason, the server computer need have only one service having the same inlet for the client computers 1 to 3 with different configurations. In addition, stub classes need not be prepared in the server computer 4.

A stub may be prepared on the server side for each of clients having difference runtime environments, and a stub generation section for generating a stub for each of clients having different runtime environments may be prepared on the server side. In this case, in transmitting a stub request from a client to the server, a client identifier capable of specifying the runtime environment of the client is transmitted in addition to the stub name. On the server side, an appropriate stub is searched for on the basis of the designated stub name and client identifier and returned to the client of the request source. If no appropriate stub is present, a stub appropriate for the runtime environment of the client having the designated client identifier is generated and returned to the client of the request source. With this arrangement, an appropriate stub can be downloaded from a single server computer to each of a plurality of client computers having runtime environments of different types.

As has been described above, according to the present invention, an appropriate stub can be downloaded from a single server computer to each of a plurality of client computers having different types of runtime environments. In the arrangement for dynamically generating a stub by the stub generation section, stubs corresponding to all configurations need not be prepared on the server side in advance.

What is claimed is:

1. A stub search loading system for, in executing remote method invocation from a plurality of clients to a server, downloading a stub necessary in a request source client from the server, wherein the request source client comprises stub search means for sending a stub request formed from a stub name and client identifier to the server and receiving a stub returned from the server, and the server comprises a stub search interface for, in response to the stub request from the request source client, returning to the request source client the stub appropriate for a runtime environment of the request source client on the basis of the designated stub name and client identifier, wherein, the server supports a plurality of different runtime environments and returns to the request source client the stub selected for the runtime environment of the request source client, and the stub search interface of the server utilizes the client identifier to determine the appropriate runtime environment for the request source client from the plurality of different runtime environments supported by the server.

2. A system according to claim 1, wherein the server further comprises a plurality of stub sets, each of the stub sets corresponding to one of the plural runtime environments and including stubs to be used together with a skeleton used in the server at the time of remote method invocation from the request source client, and upon receiving the stub request from the request source client, said stub search interface searches said stub set for the corresponding stub on the basis of the designated stub name and client identifier and returns the stub to the request source client.

3. A system according to claim 2, wherein the server further comprises stub generation means (30) for generating, for each of types of the clients having different runtime environments, a stub to be used together with a skeleton used in the server at the time of remote method invocation from the client, and when the corresponding stub is not present in said stub set, said stub search interface returns to the request source client the stub appropriate for the runtime environment of the request source client, which is generated by said stub generation means on the basis of the designated stub name and client identifier.

4. A system according to claim 1, wherein the server further comprises stub generation means (30) for generating, for each of types of the clients having different runtime environments, a stub to be used together with a skeleton used in the server at the time of remote method invocation from the request source client, and upon receiving the stub request from the client, said stub search interface returns to the request source client the stub appropriate for the runtime environment of the request source client, which is generated by said stub generation means on the basis of the designated stub name and client identifier.

5. A stub search loading method of, in executing remote method invocation from a plurality of clients to a server, downloading a stub necessary in a request source client from the server, comprising by comprising the steps of:

sending a stub request formed from a stub name and client runtime identifier from the request source client to the server;

upon receiving the stub request, returning from the server to the request source client a stub to be used together with a skeleton used in the server at the time of remote method invocation from the request source client, the stub returned to the requesting source client being selected on the basis of the designated stub name and the client runtime identifier so that the stub is appropriate for a runtime environment of the requesting source client; and receiving, at the request source client, the stub transmitted from the server.

6. A method according to claim 5, wherein the return step comprises the steps of in the server on the basis of the designated client runtime identifier, selecting one of plural stub sets in which a stub to be used together with a skeleton used in the server at the time of remote method invocation from the request source client is prepared for each of types of the clients having different runtime environments, selecting the stub having the designated stub name from the selected stub set, and transmitting the selected stub from the server to the request source client.

7. A method according to claim 6, wherein the return step comprises the steps of in the server, when a stub cannot be selected from the stub set, generating a stub to be used together with a skeleton used in the server at the time of remote method invocation from the request source client on the basis of the designated stub name and client runtime identifier, and transmitting the generated stub from the server to the request source client.

8. A method according to claim 5, wherein the return step comprises the steps of in the server on the basis of the designated stub name and client runtime identifier, generating a stub to be used together with a skeleton used in the server at the time of remote method invocation from the request source client, and transmitting the generated stub from the server to the request source client.

9. A server apparatus for providing a stub necessary in executing remote method invocation to a request source client in response to a stub request from the client, comprising:

a stub search interface for, in response to the stub request from the request source client, returning to the request source client the stub appropriate for a runtime environment of the request source client, the stub appropriate for the runtime environment of the request source client being determined, from plural supported runtime environments, on the basis of the designated stub name and client identifier.

10. An apparatus according to claim 9, wherein said apparatus further comprises a plurality of stub sets, each of the stub sets corresponding to one of the plural runtime environments and including stubs to be used together with a skeleton used at the time of remote method invocation from the request source client, including the request source client, and upon receiving from the request source client the stub request formed from the stub name and client identifier, said stub search interface searches said stub set for the appropriate stub on the basis of the designated stub name and client identifier and returns the stub to the request source client.

11. An apparatus according to claim 10, wherein said apparatus further comprises stub generation means for generating, for each of plural types of clients having different runtime environments, including the request source client, a stub to be used together with a skeleton used at the time of remote method invocation from the client, and when the corresponding stub is not present in said stub set, said stub search interface returns to the request source client the stub appropriate for the runtime environment of the request source client, which appropriate stub is generated by said stub generation means on the basis of the designated stub name and client identifier.

12. An apparatus according to claim 9, wherein said apparatus further comprises stub generation means for generating, for each of plural types of clients having different runtime environments, including the request source client, a stub to be used together with a skeleton used at the time of remote method invocation from the request source client, and upon receiving the stub request from the client, said stub search interface returns to the request source client the stub appropriate for the runtime environment of the request source client, which appropriate stub is generated by said stub generation means on the basis of the designated stub name and client identifier.

13. A client apparatus for downloading a stub necessary in a client in executing remote method invocation from a server, comprising:

stub search means for transmitting a stub request formed from a stub name and client identifier to a server having a stub search interface for, in response to the stub request from the client, returning to the request source client the stub appropriate for a runtime environment of the request source client on the basis of the designated stub name and client identifier, and receiving the stub returned from the server apparatus in response to the stub request, the client identifier being used to determine the runtime environment of the request source client.

14. An apparatus according to claim 13, wherein said apparatus further comprises a plurality of stub sets, each of the stub sets corresponding to one of the plural runtime environments and including stubs to be used together with a skeleton used in the server apparatus at the time of remote method invocation from the request source client, and upon receiving from the request source client the stub request formed from the stub name and client identifier, the stub search interface searches said stub set for the appropriate stub on the basis of the designated stub name and client identifier and returns the stub to the request source client.

15. An apparatus according to claim 14, wherein said apparatus further comprises stub generation means for generating, for each of types of clients having different runtime environments a stub to be used together with a skeleton used in the server apparatus at the time of remote method invocation from the client, and when the corresponding stub is not present in said stub set, the stub search interface returns to the request source client the stub appropriate for the runtime environment of the request source client, which is generated by said stub generation means on the basis of the designated stub name and client identifier.

16. An apparatus according to claim 13, wherein said apparatus further comprises stub generation means for generating, for each of types of clients having different runtime environments, including the request source client, a stub to be used together with a skeleton used in the server apparatus at the time of remote method invocation from the request source client, and upon receiving the stub request from the client, the stub search interface returns to the request source client the stub appropriate for the runtime environment of the request source client, which is generated by said stub generation means on the basis of the designated stub name and client identifier.

17. A computer-readable recording medium which stores a program for executing stub search loading processing of, in executing remote method invocation from a plurality of clients to a server, downloading a stub necessary in a request source client from the server, wherein the program comprises:

a procedure code for sending a stub request formed from a stub name and client identifier from the request source client to the server, the client identifier being usable to determine a runtime environment type of the request source client;

a procedure code for, upon receiving the stub request, returning from the server to the request source client a stub to be used together with a skeleton used in the server at the time of remote method invocation from the request source client, on the basis of the designated stub name and client identifier, the stub being appropriate for the runtime environment type of the request source client as determined from the client identifier; and a procedure code for receiving, at the request source client, the stub transmitted from the server.

18. A medium according to claim 17, wherein the program for executing the procedure code for returning comprises a procedure code for, in the server on the basis of the designated client identifier, selecting one of plural stub sets, in which a stub to be used together with a skeleton used in the server at the time of remote method invocation from the request source client is prepared for each of types of the clients having different runtime environments, a procedure code for selecting the stub having the designated stub name from the selected stub set, and a procedure code for transmitting the selected stub from the server to the request source client.

19. A medium according to claim 18, wherein the program for executing the procedure code for returning comprises a procedure code for, in the server, when a stub cannot be selected from the stub set, generating a stub to be used together with a skeleton used in the server at the time of remote method invocation from the request source client on the basis of the designated stub name and client identifier, and a procedure code for transmitting the generated stub from the server to the request source client.

20. A medium according to claim 17, wherein the program for executing the procedure code for returning comprises a procedure code for, in the server on the basis of the designated stub name and client identifier, generating a stub to be used together with a skeleton used in the server at the time of remote method invocation from the request source client, and a procedure code for transmitting the generated stub from the server to the request source client.

21. A computer-readable recording medium which stores a program for executing processing of providing a stub necessary in executing remote method invocation to a request source client in response to a stub request from the client, wherein the program comprises:

a procedure code for, in response to the stub request from the request source client, returning to the request source client the stub appropriate for a runtime environment of the request source client on the basis of the designated stub name and client identifier, the client identifier being used to determine the runtime environment of the request source client.

22. A medium according to claim 21, wherein the program for executing the procedure code for returning comprises a procedure code for, in the server on the basis of the designated client identifier, selecting one of plural stub sets in which a stub to be used together with a skeleton used in the server at the time of remote method invocation from the request source client is prepared for each of types of the clients having different runtime environments, a procedure code for selecting the stub having the designated stub name from the selected stub set, and a procedure code for transmitting the selected stub from the server to the request source client.

23. A medium according to claim 22, wherein the program for executing the procedure code for returning comprises a procedure code for, in the server, when a stub cannot be selected from the stub set, generating a stub to be used together with a skeleton used in the server at the time of remote method invocation from the request source client on the basis of the designated stub name and client identifier, and a procedure code for transmitting the generated stub from the server to the request source client.

24. A medium according to claim 21, wherein the program for executing the procedure code for returning comprises a procedure code for, in the server on the basis of the designated stub name and client identifier, generating a stub to be used together with a skeleton used in the server at the time of remote method invocation from the request source client, and a procedure code for transmitting the generated stub from the server to the request source client.

25. A stub search loading system, comprising:

a stub search section for installation on plural client computers of differing runtime environments; and a stub search interface for installation on a server computer in communication with the plural client computers, the stub search section permitting each client computer, as a requesting client computer, to issue a stub class request to the stub search interface, and to download from the server computer the requested stub class for remote method invocation to the server computer, the downloaded stub class being provided from the server computer to the requesting client computer in the runtime environment of the requesting client computer, the stub class request comprising a stub class name and a client identifier, the runtime environment of the requesting client computer being determinable from the client identifier, the stub search interface responding to the stub class request, on the basis of the designated stub class name and client identifier, by returning to the requesting client computer the requested stub class appropriate for the runtime environment of the requesting client computer.

26. A stub search loading system of claim 25, wherein, the stub search interface responds to the stub class request by:

using the client identifier to determine which of a plurality of stub class sets for the differing runtime environments is appropriate for searching to determine if the server computer has an existing stub class that matches the stub class name in the stub class set of the runtime environment of the requesting client computer, and when the server computer does not have the existing stub class that matches the stub class name in the stub class set of the runtime environment of the requesting client computer, the server computer dynamically generates an appropriate stub class, in the runtime environment of the requesting client computer, for returning to the requesting client computer.

* * * * *